Sept. 8, 1959  W. REICHELT ET AL  2,903,544
COATING
Filed April 18, 1956

INVENTORS.
WALTER REICHELT
HEINZ SCHMEKEN
BY

Christie, Parker & Hale
ATTORNEYS

United States Patent Office 2,903,544
Patented Sept. 8, 1959

2,903,544

COATING

Walter Reichelt, Hanau, and Heinz Schmeken, Dortmund-Aplerbeck, Germany, assignors to W. C. Heraeus, G.m.b.H., Hanau, Germany Application April 18, 1956, Serial No. 578,936

22 Claims. (Cl. 219—19)

This invention relates to vapor coating and more particularly to heating elements for vaporizing coating substances.

Various objects of metal, glass or organic material are often coated by the evaporation of metallic or other substances for various purposes, such as increasing the sales appeal of the objects, for optics coating, light filters, or to produce highly reflective surfaces.

In vapor coating it is desirable to have a source of vapor which is as pure as possible in order to obtain a coating of highest quality, but many of the coating materials have very high melting and boiling points which make it difficult to find suitable inert containers for holding and heating the boiling coating material. Aluminum, for example has a melting point of 660° C. and a boiling point of 1800° C., and has been particularly troublesome in attacking the crucible or "boat" in which it is held during the coating operation. The reaction between the coating material and the crucible not only introduces impurities which mar the finished coating on the treated object, but it also reduces the useful life of the crucible.

Tungsten and molybdenum have been used as crucible material because of their high melting points, but these metals have the disadvantage that they form alloys with most of the metals which are used for vaporization, particularly with aluminum, and very quickly lose their mechanical strength and high conductivity.

Graphite boats or crucibles have been used in an attempt to overcome the attack on the crucible by the material being evaporated. Graphite remains solid at relatively high temperatures, but it tends to react with the material being evaporated to form carbides which often lead to impurities in the stream of coating vapor. In addition to this disadvantage, graphite is not readily wetted by molten metals. Wetting of the crucible or boat is desirable since it facilitates the handling of the molten coating material and insures uniform evaporation with a minimum of splattering.

Silicon carbide has recently been suggested for use as a crucible material. This material is relatively stable as far as forming an undesirable alloy with the coating material is concerned, but it has the disadvantage of undergoing thermal decomposition at the temperatures necessary for the evaporation of many materials. Furthermore, silicon carbide has a high specific electrical resistance so that an undesirably high voltage must be applied to cause enough current to flow through the crucible to raise its temperature sufficiently to provide a suitable vapor pressure of the coating material.

This invention provides a heating element which retains its mechanical strength up to temperatures well above those required for the evaporation of most coating materials, and which does not form undesirable carbides or other alloys with the coating material. The heating element of the invention also has good electrical conductivity so that abnormally high voltages are not required to produce the necessary heating.

Briefly, the invention contemplates a heating element for evaporating materials in which the element is a mixture of a ceramic material and an electrical conductor in elemental form. Preferably the ceramic is a metallic oxide and the electrical conductor in elemental form is a metal of high melting point, such as tungsten or molybdenum, or is an alloy of a metal such as an alloy of tungsten or molybdenum.

In its preferred form, the heating element includes about 40% to 90% metal by weight, the remainder being made up of the ceramic.

The heating element is prepared by mixing the metal and ceramic in powdered or pulverized form. The powdered mixture is bonded by any suitable cementing agent, say a plastic, and is then molded into the desired shape by a press. The molded mixture is heated to a temperature below the melting point of at least one component, but to a temperature high enough to cause sintering so that the particles of ceramic and metal are bonded together to give a heating element of high mechanical strength.

The heating element exhibits a good stability toward molten metals as well as non-metals, particularly the molten oxides. For example, even during evaporation of aluminum there is no reaction of the aluminum with the metal of the heating element although the metal may be tungsten or molybdenum, which are readily attacked as used in crucibles prior to this invention. The superior performance of the heating element is likely due to the fact that the metallic component of the element is disposed in fine canals or capillaries throughout the body of the heating element, and that the ceramic is likewise disposed throughout the heating element body. The ceramic portion of the structure probably limits the penetration of the material being evaporated into the interior of the body and confines any alloy formation to the immediate surface of the heating element. Conversely, the metallic framework may hinder the dissolving out of the heating element body the ceramic components due to action by oxides or molten slags. Whatever the explanation, the result is a heating element with good stability, mechanical strength, and electrical and thermal conductivity. The latter two properties are insured by the metal capillaries running through the heating element body. Therefore, these ceramic-metallic sintered heating elements are particularly well suited for use as hot-conductor sources for the evaporation of high melting materials.

Another important advantage of the heating elements of this invention is that they are very easily wetted, not only by molten metal, but also by molten oxides or by other dielectric molten materials. Moreover, this wetting takes place without the formation of alloys or dissolving the material out of the electrical body. This "good wetting" of the electrical heating element by the material being evaporated results in the material "creeping" or spreading along the surface of the heating element to provide a uniform source of coating material vapor.

Another advantage of the heating elements of this invention is that they are easily formed into any desirable shape, which may not readily be done with prior heating elements made of pure metals, such as tungsten or molybdenum, due to the brittleness of these metals. The powdered mixture of ceramic and metal can be pressed directly into the desired shape by incorporating suitable binders, say organic plastics. The powdered mixture is then heated sufficiently to bring about sintering so that the heating element is permanently and strongly bonded in its desired shape. During the sintering operation, shrinkage is sometimes encountered, and with those materials in which there is some shrinkage, allowance is made by making the heating element slightly oversize prior to sintering so that the final product has the desired dimensions.

The heating elements sintered in the above described manner are characterized by a high mechanical stability. This strength is somewhat dependent on the sintering temperature, so that the mechanical stability required for special purposes can be obtained through sintering it at corresponding temperatures. In any case, the differing coefficients of thermal expansion of components in the heating element in no way adversely affects the mechanical stability of the element.

At the present time, aluminum oxide is preferred as the ceramic component in the heating element. Aluminum oxide can in general be used with most metallic components and is desirable because of its high melting point. The metal which makes up the heating element may be any with a suitable melting point, and the following have been used with good success; tungsten, molybdenum, chromium, and alloys, such as molybdenum and silicon. A finished sintered heating element made from combining the above components exhibits a very low vapor pressure so that it may be used to evaporate practically all metals, especially those such as aluminum, iron, nickel, cobalt, etc., or also very high melting non-metallic materials. The low vapor pressure and chemically inert characteristics of the heating element results in a very pure source of coating vapor, and on condensing, the vapor forms a high quality coating.

The components of the heating element may be mixed in various proportions of ceramic and metal to obtain a heating element of desired properties. The metal content of the sintered body should be between about 40% and about 90% by weight, and preferably 50% to 80% by weight. When the metal content of the heating element is reduced much below about 40%, the electrical and thermal conductivity of the heating element becomes so low that the element is not well suited for high temperature evaporation.

While aluminum oxide is preferred as the ceramic component, other ceramics and oxides may also be used. For example, zirconium oxide, beryllium oxide, thorium oxide and magnesium oxide also result in heating elements of superior properties when mixed with the metals and alloys mentioned above. Mixtures of oxides may also be used as the ceramic component, e.g., spinel ($MgO \cdot Al_2O_3$). In some cases, during the sintering of various combinations of materials a protective gas must be used, for example hydrogen.

These and other aspects of the invention will be more fully understood from the following detailed description taken in conjunction with the accompanying drawings in which.

Figure 1:
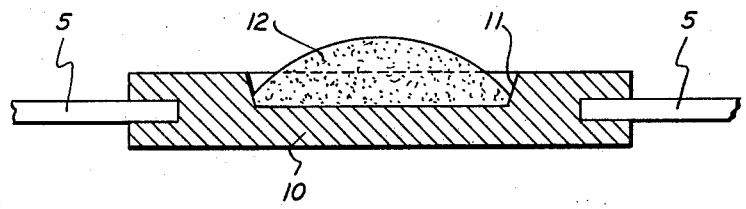
Fig. 1 is a sectional elevation of the presently preferred form of the heating element of the invention.

The heating elements of this invention are used to their best advantage when shaped in certain suitable forms. Referring to Fig. 1 which shows the preferred form for the heating element of this invention, the heating element comprises a horizontal, elongated body 10 which is a sintered mixture of powdered aluminum oxide and powdered molybdenum, including 80% molybdenum by weight. A trough or bore 11 is formed in the upper surface and center of the body to hold a material 12, such as aluminum, which is to be evaporated. A separate electrical terminal 5 is embedded in each end of the body. The trough serves two purposes. It holds the material to be evaporated, and it decreases the cross section of the body in the region of the material to be evaporated to provide more intensive heating of the body in that region so that heat transfer to the material to be evaporated is increased. Any tendency for the body of Fig. 1 to warp due to heating can be reduced by providing the opposite or lower face of the body with a matching trough (not shown) to provide a symmetrical shape which will not warp on heating or cooling.

Figure 2:
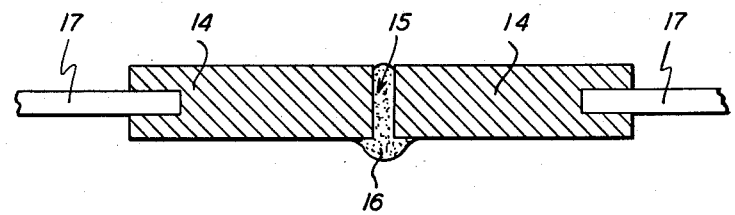
Fig. 2 is a sectional elevation of an alternate embodiment of the invention.

Another form of the electrical heating element is shown in Fig. 2 in which the heating element comprises a pair of horizontal, elongated bodies 14, each body being spaced from and positioned collinearly with respect to the other. The adjacent ends of the two bodies are spaced closely together to form a narrow gap 15 in which there is disposed a material 16 to be evaporated, say aluminum, through which the current passes from one body to the other to cause the material to melt and evaporate. A separate electrode 17 is embedded in the outer end of each body 14. A hanging drop is formed below the gap between the two bodies and is in the position shown due to the wetting of the heating element by the melting material being evaporated. The evaporation of the material takes place principally from this drop. By any of several suitable and well known devices the material to be evaporated can be introduced continuously to the gap 15.

Figure 3:
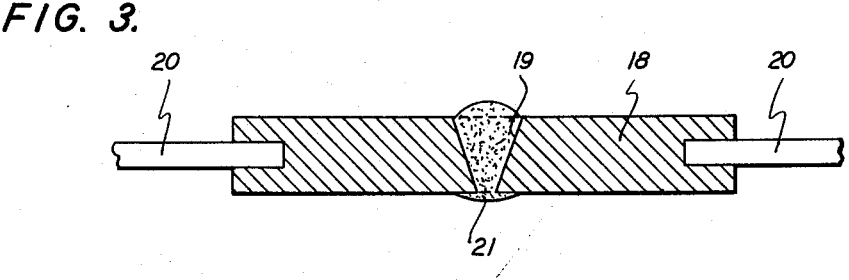
Fig. 3 is a sectional elevation of another form in which the element may be used.

Fig. 3 shows another arrangement of the heating element in accordance with this invention, in which a horizontal, elongated body 18 made of aluminum oxide and molybdenum has in its center a frusto-conical bore 19 extending vertically through the body. Electrical terminals 20 are embedded at opposite ends of the body 18. The inverted frusto-conical bore serves to hold a material 21 to be evaporated and also to reduce the cross section of the heating element in the vicinity of the material to be evaporated. The material is melted by the passage of current and forms a well attached and "wetting" handing drop from which most of the evaporation takes place.

Figure 4:
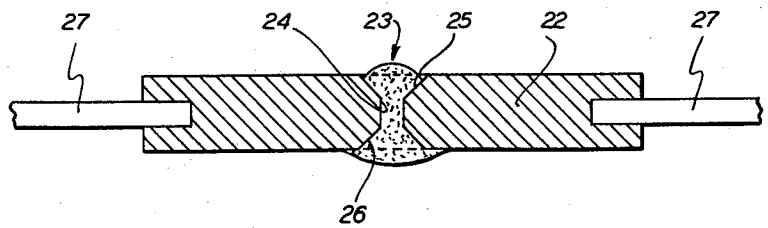
Fig. 4 is a sectional elevation of another form which the heating element of this invention may take.

Fig. 4 shows another embodiment of the invention in which a horizontal, elongated body 22, made of a suitable mixture of ceramic and metal as described above, has a central bore 23 intermediate its ends. The bore has a vertical central section 24 of uniform diameter which opens at its upper end into an inverted frusto-conical section 25, and which opens at its lower end into a frusto-conical section 26. Electrodes 27 are embedded at opposite ends of the body 22. A material to be evaporated is disposed in the bore 23, and when melted, assumes the form shown in Fig. 4.

Due to the inert nature of the heating element of this invention, high melting materials can be evaporated to produce uncontaminated vapors, which in turn form pure coatings of high quality, for example, brilliant reflecting aluminum coatings.

We have discovered that even the good wettable nature of the heating element by most of the metals of importance in evaporation applications, particularly aluminum, can be further improved by the addition to the melt of small quantities of certain metals of low vapor pressure. For example, zirconium and cobalt have been effective in reducing the oxide skin layer on the melt and in reducing the effect of high surface tensions which occur as a result of oxide formation. These low vapor pressure metals also reduce the harmful spattering of the boiling and evaporating metal melt. The vapor pressure of these additional metals is relatively low so that there is negligible simultaneous evaporation of them with the coating material to produce undesired side effects.

The electrical heating element of this invention has proved satisfactory not only for the evaporation of aluminum but also for many other materials used for evaporation applications, particularly for iron, cobalt, nickel, platinum and palladium.

We claim:

1. A heating element for evaporating materials, the element including means to hold a molten material in heat-conducting relationship therewith and being composed of a sintered mixture of a ceramic and an electrically conductive material in elemental form, the material being present in the amount of about 50% to 80% by weight.

2. A heating element for evaporating materials, the element including means to hold a molten material in heat-conducting relationship therewith and being composed of a sintered mixture of a metal oxide and an electrically conductive material in elemental form.

3. A heating element for evaporating materials, the element including means to hold a molten material in heat-conducting relationship therewith and being composed of a sintered mixture of a metal oxide and a metallic conductor in elemental form.

4. A heating element according to claim 3 in which the metal oxide is aluminum oxide.

5. A heating element according to claim 3 in which the metal oxide is zirconium oxide.

6. A heating element according to claim 3 in which the metal oxide is beryllium oxide.

7. A heating element according to claim 3 in which the metal oxide is thorium oxide.

8. A heating element according to claim 3 in which the metal oxide is magnesium oxide.

9. A heating element according to claim 3 in which the metal oxide is spinel.

10. A heating element according to claim 3 in which the metallic conductor is tungsten.

11. A heating element according to claim 3 in which the metallic conductor is molybdenum.

12. A heating element according to claim 3 in which the metallic conductor is chromium.

13. A heating element according to claim 3 in which the metallic conductor is tantalum.

14. A heating element for evaporating materials, the element being a sintered mixture of a ceramic and an electrical conductor in elemental form, and having a bore intermediate its ends for holding the material to be evaporated.

15. A heating element for evaporating materials, the element comprising a pair of electrodes spaced from each other to form a gap to contain the material to be evaporated, each electrode being a sintered mixture of a ceramic and an electrical conductor in elemental form.

16. A heating element for evaporating materials, the element being a sintered mixture of a ceramic and an electrical conductor in elemental form, and having a trough formed in one surface for holding the material to be evaporated.

17. A heating element for evaporating materials, the element being a sintered mixture of a ceramic and an electrical conductor in elemental form, the element having a frusto-conical bore in one face, an inverted frusto-conical bore in another face, and the two bores being interconnected within the element.

18. A heating element for evaporating materials, the element being a sintered mixture of a metal oxide and a metallic conductor in elemental form in which the metallic conductor comprises at least one metal having a high melting temperature, the element including means to hold a quantity of molten material to be evaporated in heat-conducting relationship therewith.

19. A heating element for evaporating materials, the element being a sintered mixture of a metal oxide and a metallic conductor in elemental form in which the metallic conductor comprises at least one metal having a melting temperature above 1800° C., the element including means to hold a quantity of a molten material to be evaporated in heat-conducting relationship therewith.

20. A heat element for evaporating molten material, the element being composed of a sintered mixture of a ceramic and electrical conductive material in elemental form, the element including means to hold the molten material in heat conducting relationship therewith.

21. A heat element for evaporating molten material, the element being composed of a sintered mixture of a powdered ceramic and an electrical conductive powdered metal in elemental form, the element including means to hold the molten material in heat conducting relationship therewith.

22. A heat element for evaporating molten materials, the element being composed of a sintered mixture of an electrical conductive material in elemental form and a ceramic, the electrical conductive material being present in the amount of about 40% to about 90% by weight, the element including means to hold the molten material in heat conducting relationship therewith.

References Cited in the file of this patent

UNITED STATES PATENTS

| | | |
|---|---|---|
| 1,074,333 | Thowless | Sept. 30, 1913 |
| 1,461,118 | Hall | July 10, 1923 |
| 2,356,237 | Geller | Aug. 22, 1944 |
| 2,557,530 | Bancroft | June 19, 1951 |
| 2,615,060 | Marinace et al. | Oct. 21, 1952 |
| 2,622,304 | Coffer | Dec. 23, 1952 |
| 2,693,521 | Alexander | Nov. 2, 1954 |
| 2,845,515 | Anderson et al. | July 29, 1958 |